United States Patent
Ryu et al.

(10) Patent No.: US 11,773,021 B2
(45) Date of Patent: Oct. 3, 2023

(54) CONCRETE VACUUM TUBE SEGMENT FOR HYPER-SPEED TRANSPORTATION SYSTEM USING ULTRA-HIGH PERFORMANCE CONCRETE (UHPC), AND MANUFACTURING METHOD THEREOF

(71) Applicant: KOREA INSTITUTE OF CIVIL ENGINEERING AND BUILDING TECHNOLOGY, Gyeonggi-Do (KR)

(72) Inventors: Gum Sung Ryu, Gyeonggi-do (KR); Jae Yoon Kang, Gyeonggi-do (KR); Gi Hong An, Gyeonggi-do (KR); Byung Suk Kim, Gyeonggi-do (KR); Jae Joon Song, Seoul (KR); Kyung Taek Koh, Gyeonggi-do (KR); Jong Dae Baek, Gyeonggi-do (KR)

(73) Assignee: KOREA INSTITUTE OF CIVIL ENGINEERING AND BUILDING TECHNOLOGY, Gyeonggi-do (KR)

( * ) Notice: Subject to any disclaimer, the term of this patent is extended or adjusted under 35 U.S.C. 154(b) by 364 days.

(21) Appl. No.: 17/110,314

(22) Filed: Dec. 3, 2020

(65) Prior Publication Data
US 2022/0135479 A1    May 5, 2022

(30) Foreign Application Priority Data
Nov. 3, 2020 (KR) .......................... 10-2020-0145567

(51) Int. Cl.
C04B 24/26 (2006.01)
C04B 16/06 (2006.01)
(Continued)

(52) U.S. Cl.
CPC ............ *C04B 24/2641* (2013.01); *B28B 1/14* (2013.01); *C04B 14/06* (2013.01); *C04B 14/386* (2013.01);
(Continued)

(58) Field of Classification Search
None
See application file for complete search history.

(56) References Cited

U.S. PATENT DOCUMENTS

| | | | |
|---|---|---|---|
| 9,090,508 B2 | 7/2015 | Gong et al. | |
| 2014/0326168 A1* | 11/2014 | Tanaka | C04B 20/0048 106/816 |
| 2015/0166414 A1* | 6/2015 | Tanaka | C04B 28/04 106/714 |

FOREIGN PATENT DOCUMENTS

| KR | 101751479 | 6/2017 |
|---|---|---|
| KR | 101830638 | 2/2018 |

(Continued)

*Primary Examiner* — John J Figueroa
(74) *Attorney, Agent, or Firm* — JCIPRNET

(57) ABSTRACT

The present invention provides a concrete vacuum tube segment for a hyper-speed transportation system using ultra-high performance concrete (UHPC) and a manufacturing method thereof. A concrete vacuum tube segment for a hyper-speed transportation system can be easily manufactured using UHPC, in which shrinkage and structural cracking do not occur due to mixing a binder and a short fiber to secure airtightness on the basis of a maximum fill theory, and accordingly, shrinkage of the concrete vacuum tube segment can be reduced even in a partial-vacuum state in which the magnitude of drying shrinkage is very small and quick drying occurs; when mixing the UHPC, an antifoaming agent is mixed and a circular vacuum pump is used to remove generated entrapped air to minimize the entrapped air; and a capsule-type crack healing material, which is able to repair fine cracks, is compacted to secure airtightness of the concrete vacuum tube segment.

19 Claims, 13 Drawing Sheets

(51) Int. Cl.
  *C04B 14/38*   (2006.01)
  *C04B 20/10*   (2006.01)
  *C04B 40/00*   (2006.01)
  *B28B 1/14*    (2006.01)
  *C04B 28/02*   (2006.01)
  *C04B 18/14*   (2006.01)
  *C04B 14/06*   (2006.01)
  *C04B 14/48*   (2006.01)
  *C04B 14/42*   (2006.01)
  *C04B 14/46*   (2006.01)
  C04B 103/00    (2006.01)
  C04B 103/30    (2006.01)
  C04B 103/50    (2006.01)

(52) U.S. Cl.
  CPC .......... *C04B 14/42* (2013.01); *C04B 14/4668* (2013.01); *C04B 14/48* (2013.01); *C04B 16/0691* (2013.01); *C04B 18/146* (2013.01); *C04B 20/1037* (2013.01); *C04B 28/02* (2013.01); *C04B 40/0046* (2013.01); *C04B 2103/0067* (2013.01); *C04B 2103/302* (2013.01); *C04B 2103/50* (2013.01); *C04B 2201/52* (2013.01)

(56) References Cited

FOREIGN PATENT DOCUMENTS

| KR | 101853915 | 5/2018 |
| KR | 100873514 | 12/2018 |
| KR | 102106353 | 5/2020 |

\* cited by examiner

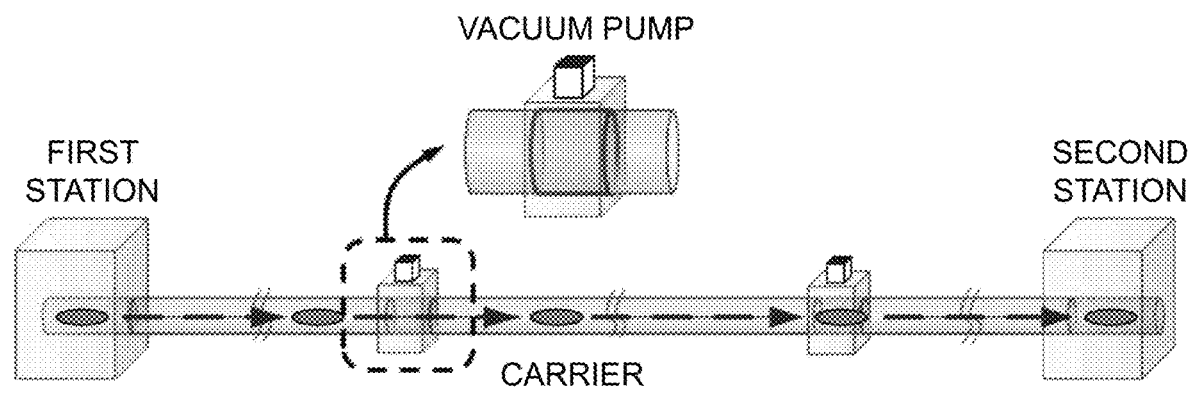
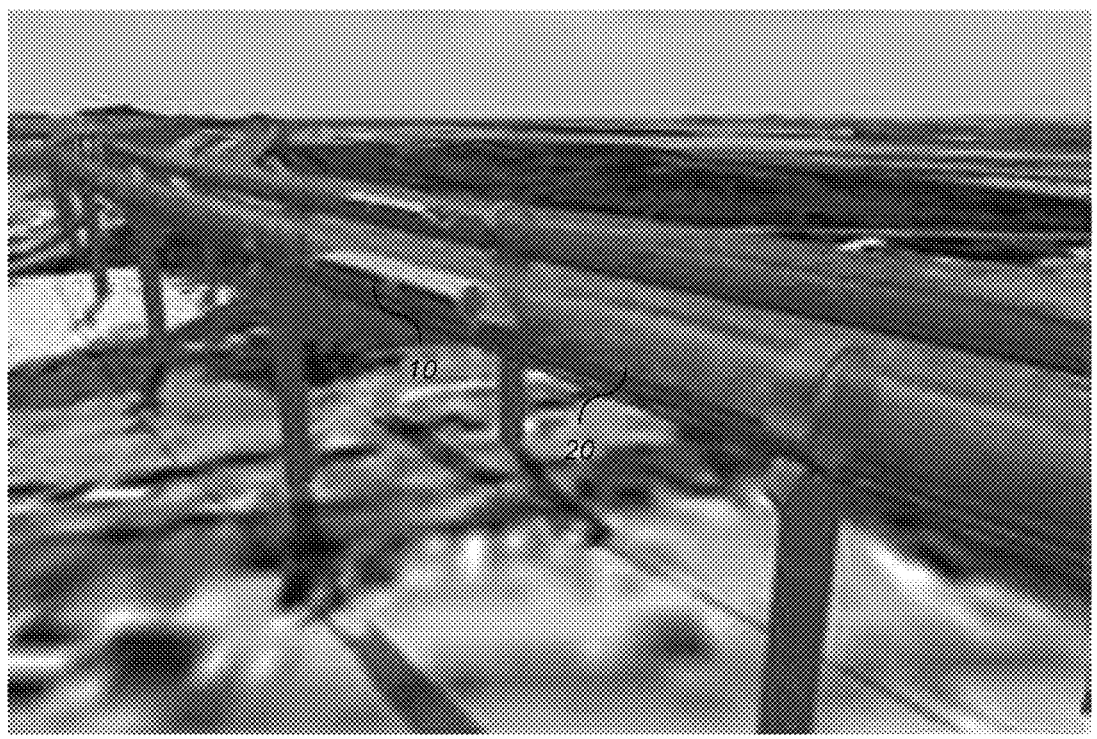
FIG. 1

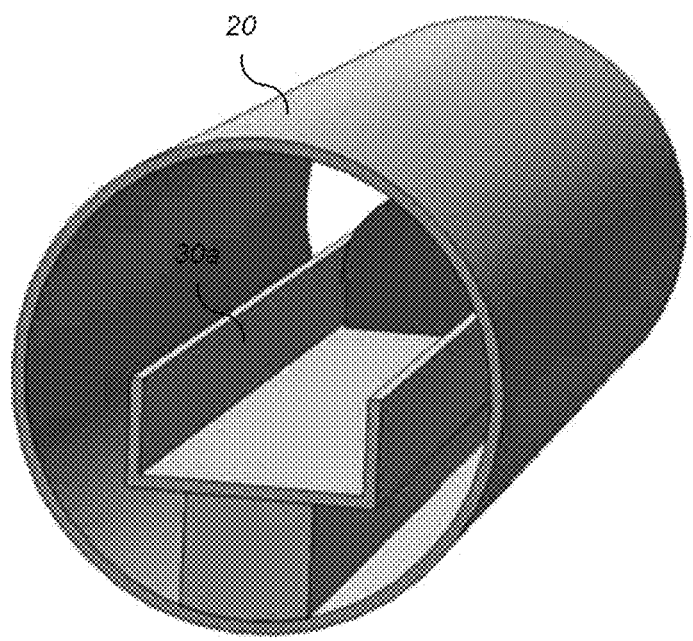
a)
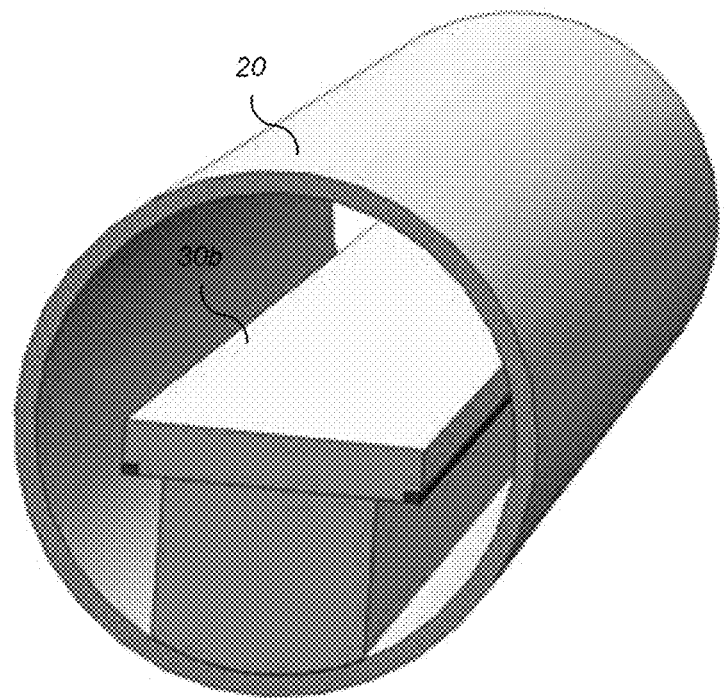
b)
FIG. 4

| CLASSIFICATION | | SELF-HEALING CEMENT COMPOSITE FOR UHPC CONCRETE VACUUM TUBE SEGMENT | |
|---|---|---|---|
| | | COMPOSITION RATIO (PARTS BY WEIGHT) | NOTES |
| BINDER (B) | CEMENT | 100 PARTS BY WEIGHT | |
| | SILICA FUME | 20 TO 30 PARTS BY WEIGHT | -SPECIFIC SURFACE AREA : 8,000~15,000cm²/g |
| | QUARTZ POWDER | 15 TO 25 PARTS BY WEIGHT | - FILLER MATERIAL(SiO₂ 99%)<br>-AVERAGE PARTICLE DIAMETER : 4um |
| FINE AGGREGATE | | 100 TO 120 PARTS BY WEIGHT | - QUARTZ SAND (SILICA SAND)<br>- PARTICLE DIAMETER : 5 MM OR LESS |
| MIXING WATER(W) | | 20 TO 28 PARTS BY WEIGHT | - W/B : 0.2 OR LESS |
| HIGH-PERFORMANCE WATER REDUCING AGENT | | 4 TO 7 PARTS BY WEIGHT | - POLYCARBOXYLIC ACID-BASED |
| ANTIFOAMING AGENT | | 1.6 TO 2.2 PARTS BY WEIGHT | - FOAM REMOVING AGENT<br>- MINIMIZE ENTRAPPED AIR (PORES) |
| SHORT FIBER | | - THE AMOUNT MIXED IS 1.5 TO 2% OF THE ENTIRE VOLUME OF SELF-HEALING CEMENT COMPOSITE<br>- STEEL FIBER, GLASS FIBER, CARBON FIBER, ARAMID FIBER, BASALT FIBER | |
| CAPSULE-TYPE CRACK HEALING MATERIAL | | - THE AMOUNT MIXED IS 0.5 TO 2% OF THE ENTIRE VOLUME OF SELF-HEALING CEMENT COMPOSITE<br>- MICROCAPSURES+POLYMER MATRIX | |

FIG. 6

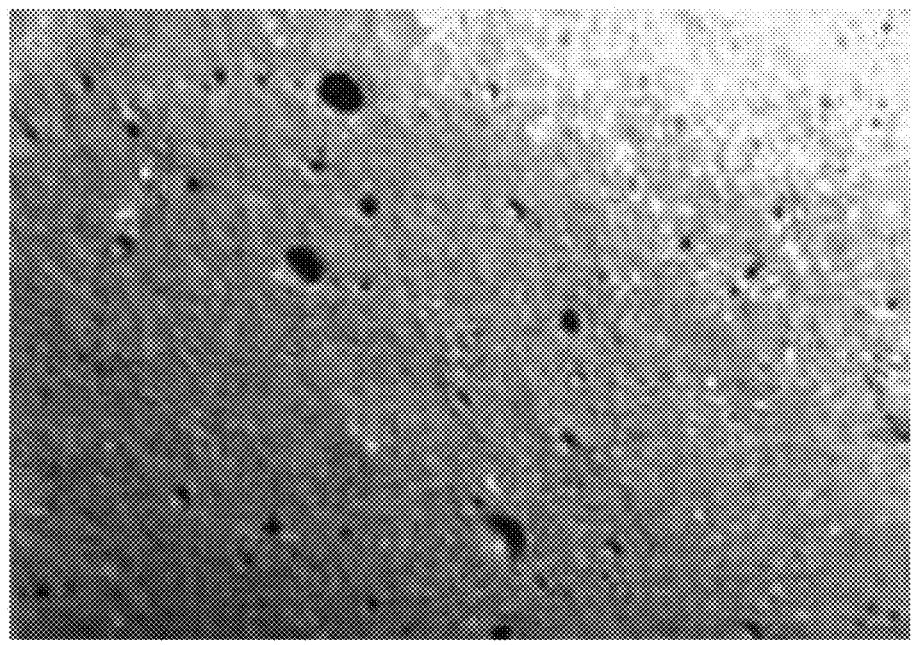
a)
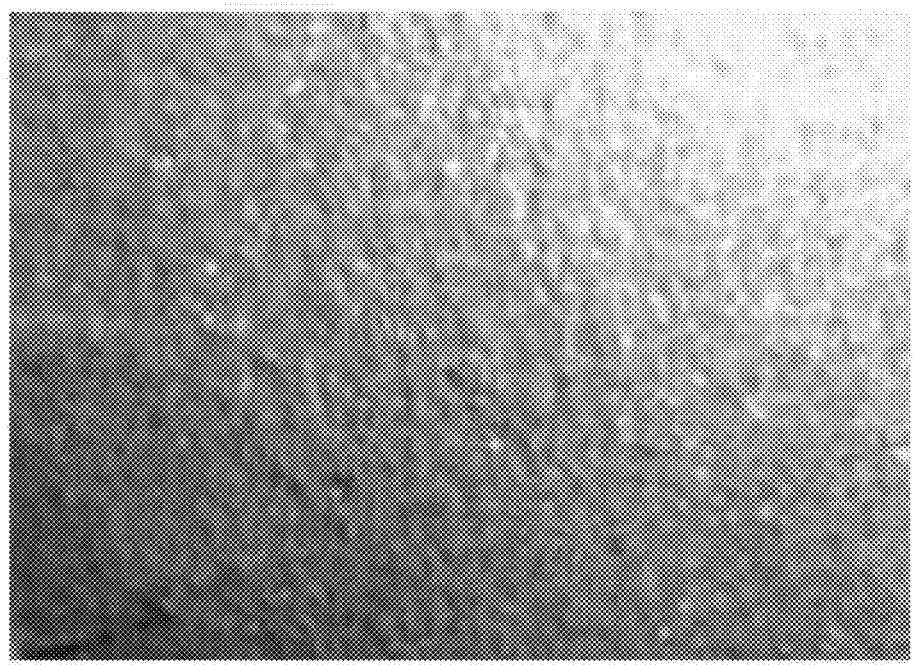
b)
FIG. 9

CIRCULAR VACUUM MIXER

_US 11,773,021 B2_

CONCRETE VACUUM TUBE SEGMENT FOR HYPER-SPEED TRANSPORTATION SYSTEM USING ULTRA-HIGH PERFORMANCE CONCRETE (UHPC), AND MANUFACTURING METHOD THEREOF

CROSS-REFERENCE TO RELATED APPLICATION

This application claims priority to and the benefit of Korean Patent Application No. 2020-0145567, filed on Nov. 3, 2020, the disclosure of which is incorporated herein by reference in its entirety.

BACKGROUND OF THE INVENTION

1. Technical Field

The present invention relates to a concrete vacuum tube segment for a hyper-speed transportation system, and more particularly, to a concrete vacuum tube segment for a hyper-speed transportation system, which is a vacuum tube segment for a hyper-speed transportation system such as the Hyperloop, and a manufacturing method thereof, in which ultra-high performance concrete (UHPC) is used to manufacture the concrete vacuum tube segment.

2. Background of Related Art

Generally, a hyper-speed tube train is a tube railway system that travels while causing a sealed space, which is a tube, to be in a partial-vacuum state in order to overcome a limitation of the speed of the existing magnetic levitation train. The hyper-speed tube train may wrap a railroad track with a tube and then cause the tube to be in a vacuum or partial-vacuum state to minimize air resistance so that a higher speed is achieved with the same output. For example, the hyper-speed tube train may wrap the track with the tube and travel at 700 km/h or more while, for example, the tube is in a partial-vacuum state in which an atmospheric pressure is in a range of 0.05 to 0.4 atm.

While the existing magnetic levitation train has limitations due to air resistance and adhesive driving method and thus it is difficult for the train to travel at hyper speed, the hyper-speed tube train system forms a tube structure, maintains a partial-vacuum state in the tube structure to reduce air resistance, and uses a linear motor to realize non-adhesive driving so that hyper-speed traveling at 700 km/h or more is possible.

Since the hyper-speed tube train system maintains an interior of the tube in a vacuum or partial-vacuum state, a high-degree of aerodynamic design and precise control technology are required. For example, a diameter of the tube may be in a range of about 4.5 m to 10 m in the existing hyper-speed tube train. Cars of the hyper-speed tube train system are likely to be cars of a hyper-speed magnetic levitation train, and the hyper-speed tube train system has a structure in which the cars are supported with a magnetic force on a guideway and propelled by a linear motor while the cars maintain spaced apart at predetermined intervals.

Meanwhile, a hyper-speed transportation system, such as the Hyperloop, which is being developed recently, is a system in which a 3.2 m-diameter tunnel, which is formed to be close to a vacuum, is formed and a single 28-seater car of a train travels therein. In the Hyperloop hyper-speed transportation system, in theory, the maximum speed is 1223 km/h, which is about two times the maximum speed of a passenger plane that is about 780 km/h. The hyper-speed transportation system is directed to address problems due to urbanization, such as population concentration, traffic congestion, traffic accidents, and environmental pollution. The hyper-speed transportation system may be considered as a sustainable future transportation means in which a partial-vacuum transportation tube, which is in a vacuum or partial-vacuum state, is developed to minimize air resistance in the transportation system so that the transportation tube may travel at hyper speed.

Specifically, the Hyperloop hyper-speed transportation system is designed so that a magnet is attached to a lower portion of a train and a magnetic field flows through a bottom of a tunnel. Here, in order to minimize friction as much as possible, the train should travel while being slightly levitated. To this end, air remaining in the tunnel is suctioned and discharged to the bottom using a fan and a compressor, which are installed at the rear of the train, so that the train maintains a state of being levitated. Using such a method, for example, a 30-ton train is allowed to move at a speed of 1,200 km/h or more. Also, in order to supply electricity that is necessary to generate a magnetic field, a solar panel may be installed at an outer wall of the vacuum tunnel, and a wind power generator may be installed around the solar panel. Since the construction cost of the Hyperloop hyper-speed transportation system is only one tenth of that of high-speed railway, fares may be lowered.

FIG. 1 is a view for describing the Hyperloop hyper-speed transportation system, FIG. 2 is a view illustrating a passenger carrier in the Hyperloop hyper-speed transportation system illustrated in FIG. 1 in detail, and FIG. 3 is a view illustrating a vacuum tube segment in the Hyperloop hyper-speed transportation system illustrated in FIG. 1 in detail.

As illustrated in a) of FIG. 1, in the Hyperloop hyper-speed transportation system, a tube is installed between two stations and a vacuum pump is used to decrease an atmospheric pressure in the tube to be less than or equal to 0.1 atm to minimize air resistance so that a carrier is allowed to travel at the maximum speed of 1,200 km/h inside the partial-vacuum tube, which is close to a vacuum.

A carrier (10) of the Hyperloop hyper-speed transportation system resembles a train as illustrated in FIG. 2, but the actual operating method of the carrier (10) is very different from that of the existing train. Also, the Hyperloop hyper-speed transportation system is basically a transportation means having a form in which the carrier (10) is moved inside a vacuum tube (20). As illustrated in FIG. 3, a propelling force of the carrier (10) may be obtained using a magnetic field inside the vacuum tube (20), and air may be ejected to the bottom to reduce a frictional force. Here, necessary power is obtained from a solar panel that surrounds an outer wall of the vacuum tube (20).

Meanwhile, FIG. 4 is a view illustrating a tube structure for a hyper-speed tube railway according to the related art.

As illustrated in FIG. 4, the tube structure for the hyper-speed tube railway according to the related art is constructed so that tracks (30a, 30b) are each surrounded by closed circular tubes (20). A carrier in the form of a pod is allowed to travel at subsonic speed inside a tube having a circular cross-section that is configured by continuously joining steel pipes.

However, the tube structure for the hyper-speed tube railway according to the related art is a transportation tube made of steel material, and since a cross-sectional second moment is relatively small in a cross-section of a hollow circular tube (or transportation tube) as compared to an I-shaped or box-shaped cross-section, the shape is unfavorable in a bridge structure in which a flexural behavior is the main form of behavior, and a separate connecting material is required to induce synthesis between a circular steel pipe and a track structure.

In particular, in a case in which the tube (or transportation tube) needs to be replaced, there is a problem in that it is necessary to partially cut the entire steel pipe and track structure. Also, there are problems in that it is necessary to place a hoop-shaped reinforcing material to secure flexural stiffness of the hollow circular cross-section that is vulnerable to flexure, and since a span should be configured to be short in order to secure the flexural stiffness, the cost increases.

Meanwhile, the most in-demand performance in the partial-vacuum transportation tube for the hyper-speed transportation system is airtightness that allows $1/1000$ atm to be maintained. Conventionally, fundamental studies have been mostly carried out on steel materials, and there is still no case of manufacturing vacuum tubes for concrete structures based on cement.

Also, concrete with general strength can secure watertightness as in an immersed tunnel or the like, but it is very difficult and not economically feasible to secure airtightness in an environment in which the atmospheric pressure is $1/1000$ atm. In order to secure the airtightness, a cover thickness should be made large. It is difficult to secure airtightness for maintaining a single vacuum, and in order to secure the airtightness, a steel formwork with a thickness of about 10 mm should be placed outside concrete to maintain a very large cover thickness. Also, since general concrete does not have a self-compacting property, it is very difficult to manufacture in a circular shape, and since concrete pouring quality may be poor in some cross-sections, it is difficult to secure airtightness. Thus, there is a need for countermeasures.

In particular, it is known that, since the partial-vacuum transportation tube for the hyper-speed transportation system includes non-continuous sections such as construction joints and segment connecting parts, airtightness of the segment itself is also important, but airtightness of the connecting parts is more important in connecting the segments.

In the case of the vacuum tube for the concrete structure, since an air permeability of the concrete itself tends to be inversely proportional to strength and an equivalent air permeability of the structure tends to increase with an increased number of joint parts, for example, it was found that it took about 4 to 5 hours for an internal atmospheric pressure of an integrated-type concrete tube to double from 10 kPa, which was an initial value, to 20 kPa. This shows that it is difficult to maintain the partial-vacuum state in the tube using general concrete, and thus a material having better airtightness is necessary. For example, ultra-high performance concrete (UHPC) may be an alternative to general concrete, but so far, there is no partial-vacuum transportation tube for hyper-speed transportation system that uses the UHPC. Also, the hyper-speed transportation system using the vacuum tube has not been realized yet, and only the concept thereof has been proposed, or research is in progress.

Meanwhile, as the related art of the above-described UHPC, "Ultra-high performance fiber-reinforced concrete and manufacturing method of the same" has been disclosed in Korean Patent Registration No. 10-1751479 that has been filed by the applicant of the present invention and registered. Since a mix proportion of the ultra-high performance fiber-reinforced concrete is designed on the basis of a maximum fill theory as well as dynamic performance and durability in which a compressive strength is in a range of 80 to 180 MPa, a flexural strength is 15 MPa or higher, a direct tensile strength is 7 MPa or higher, a service life is 100 to 200 years, and a shrinkage strain is 700 or lower, it is possible to implement ultra-high performance fiber-reinforced concrete in which the structure inside the concrete is very dense so that watertightness and airtightness are excellent. The ultra-high performance fiber-reinforced concrete and manufacturing method of the same are referenced herein and constitute part of the present invention.

Meanwhile, FIG. 5 is a picture showing a case in which entrapped air is generated while mixing the UHPC according to the related art.

Steel fibers used for the above-described UHPC have a density of 7.85 g/cm$^3$, and high viscosity should be secured to prevent a fiber ball phenomenon of the steel fibers. However, there are problems in that, since the high viscosity inevitably causes entrapped air to be generated as illustrated in FIG. 5 in the process of mixing the UHPC, it is difficult to secure airtightness, and accordingly, it is difficult to manufacture a vacuum tube segment for a hyper-speed transportation system by using the UHPC.

RELATED ART DOCUMENTS

Patent Documents (Patent Document 0001) Korean Patent Registration No. 10-2106353 (Date of Registration: Apr. 24, 2020), Title of Invention: "Ultra-high-strength resin mortar composition and construction method of underwater structure and hyperloop tube using the same"

(Patent Document 0002) Korean Patent Registration No. 10-1751479 (Date of Registration: Jun. 21, 2017), Title of Invention: "Ultra-high performance fiber-reinforced concrete and manufacturing method of the same"

(Patent Document 0003) Korean Patent Registration No. 10-1830638 (Date of Registration: Feb. 13, 2018), Title of Invention: "Tube structure for integrating tube shield into concrete slab structure for super-speed tube railway, and construction for the same"

(Patent Document 0004) Korean Patent Registration No. 10-1853915 (Date of Registration: Apr. 25, 2018), Title of Invention: "Tabular structure of slab-canopy composite modular type for hyper-speed tube railway, and construction method for the same"

(Patent Document 0005) Korean Patent Registration No. 10-0873514 (Date of Registration: Dec. 4, 2008), Title of Invention: "Binder for concrete having ultra-high strength and a method for manufacturing concrete using the binder"

SUMMARY OF THE INVENTION

The present invention is directed to providing a concrete vacuum tube segment for a hyper-speed transportation system using ultra-high performance concrete (UHPC) and a manufacturing method thereof capable of using UHPC, in which shrinkage and structural cracking do not occur due to mixing a binder and a short fiber to secure airtightness on the basis of a maximum fill theory, to manufacture the concrete vacuum tube segment for the hyper-speed transportation system.

The present invention is also directed to providing a concrete vacuum tube segment for a hyper-speed transportation system using UHPC and a manufacturing method thereof capable of, when mixing the UHPC, mixing an antifoaming agent and using a circular vacuum pump to remove generated entrapped air to minimize the entrapped air.

The present invention is also directed to providing a concrete vacuum tube segment for a hyper-speed transportation system using UHPC and a manufacturing method thereof capable of compacting a capsule-type crack healing material, which is able to repair fine cracks, to secure airtightness of the concrete vacuum tube segment.

The present invention is also directed to providing a concrete vacuum tube segment for a hyper-speed transportation system using UHPC and a manufacturing method thereof capable of, when manufacturing a circular vacuum tube segment for the hyper-speed transportation system, using self-compactable UHPC, which is able to be compacted entirely from the top of a formwork, to manufacture a concrete vacuum tube segment having better airtightness.

The present invention provides a concrete vacuum tube segment for a hyper-speed transportation system using ultra-high performance concrete (UHPC), wherein the UHPC includes 100 parts by weight of cement as a binder (B), 20 to 30 parts by weight of silica fume as the binder (B), 15 to 25 parts by weight of quartz powder as the binder (B), 100 to 120 parts by weight of fine aggregate, 20 to 28 parts by weight of mixing water (W), 4 to 7 parts by weight of a high-performance water reducing agent, and 1.6 to 2.2 parts by weight of an antifoaming agent, the UHPC is mixed with a short fiber and a capsule-type crack healing material to form a self-healing cement composite, a volume of the mixed short fiber is 1.5 to 2% of the entire volume of the self-healing cement composite, and a volume of the mixed capsule-type crack healing material is 0.5 to 2% of the entire volume of the self-healing cement composite.

Here, the self-healing cement composite may have a compressive strength in a range of 80 to 180 MPa, a flexural strength of 15 MPa or higher, a direct tensile strength of 7 MPa or higher, a service life of 100 to 200 years, and a shrinkage strain of 700 or lower.

Here, the capsule-type crack healing material may include a microcapsule and a polymer matrix, and a microcapsule that has methacrylate as a core material and poly(urea-formaldehyde) as a capsule film-forming material may be added into the polymer matrix.

Here, when fine cracks are formed and propagate in a concrete surface, in the capsule-type crack healing material, the microcapsule placed at a position where the cracks propagate may be broken so that a monomer therein flows between crack faces, and the monomer which penetrates into the cracks may cause a polymerization reaction due to light so that the cracks self-heal.

Here, the silica fume may have a specific surface area in a range of 8,000 to 15,000 $cm^2/g$.

Here, the quartz powder may be a filler material containing 99% silicon dioxide and may have an average particle diameter of 4 μm.

Here, the fine aggregate may be silica sand, which is quartz sand, and may have a particle diameter of less than or equal to 5 mm.

Here, a ratio (W/B) of the mixing water (W) to the binder (B) may be 0.2.

Here, the short fiber may be selected from the group consisting of a steel fiber, a glass fiber, a carbon fiber, an aramid fiber, and a basalt fiber and may have a length of less than or equal to 20 mm.

Here, the antifoaming agent may minimize entrapped air that is generated inside the UHPC due to high viscosity of the UHPC when mixing the UHPC.

Meanwhile, the present invention provides a method of manufacturing a concrete vacuum tube segment for a hyper-speed transportation system using ultra-high performance concrete (UHPC), the method including: a) mixing a fine aggregate with cement, silica fume, and quartz powder that serve as a binder (B); b) mixing mixing water (W) so that a ratio (W/B) of the mixing water (W) to the binder (B) is 0.2; c) mixing a high-performance water reducing agent and an antifoaming agent and manufacturing cement-based mortar using a circular vacuum mixer; d) additionally mixing a short fiber, which is for securing a tensile force, in the circular vacuum mixer to form the UHPC; e) additionally mixing a capsule-type crack healing material with the UHPC to form a self-healing cement composite; f) compacting the self-healing cement composite in a formwork; g) curing the self-healing cement composite; and h) removing the self-healing cement composite from the formwork to complete the concrete vacuum tube segment for a hyper-speed transportation system.

Here, in operation c), when mixing the UHPC, the circular vacuum pump may be used to remove generated entrapped air to minimize the entrapped air.

Here, the self-healing cement composite in operation f) may be formed using self-compactable UHPC and may be entirely compacted from the top of the formwork to allow the concrete vacuum tube segment to have high airtightness.

BRIEF DESCRIPTION OF THE DRAWINGS

The above and other objects, features and advantages of the present invention will become more apparent to those of ordinary skill in the art by describing exemplary embodiments thereof in detail with reference to the accompanying drawings, in which:

FIG. 1 is a view for describing a Hyperloop hyper-speed transportation system;

FIG. 4 is a view illustrating a tube structure for a hyper-speed tube railway according to the related art;

FIG. 6 is a view illustrating a composition ratio of the UHPC in a concrete vacuum tube segment for a hyper-speed transportation system using the UHPC according to an embodiment of the present invention;

FIG. 9 shows pictures that show before and after of removal of entrapped air when using the UHPC;

DETAILED DESCRIPTION OF EXEMPLARY EMBODIMENTS

Figure 2:
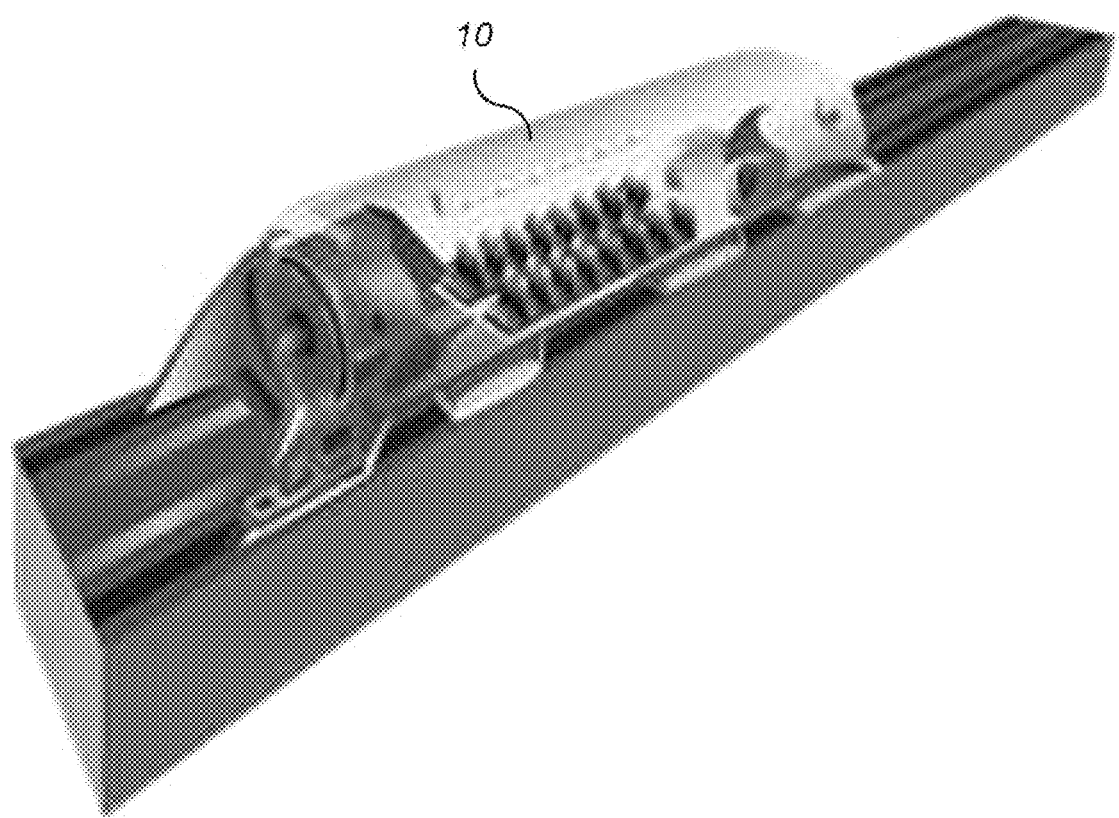
FIG. 2 is a view illustrating a passenger carrier in the Hyperloop hyper-speed transportation system illustrated in FIG. 1 in detail.
Figure 3:
FIG. 3 is a view illustrating a vacuum tube segment in the Hyperloop hyper-speed transportation system illustrated in FIG. 1 in detail.
Figure 5:
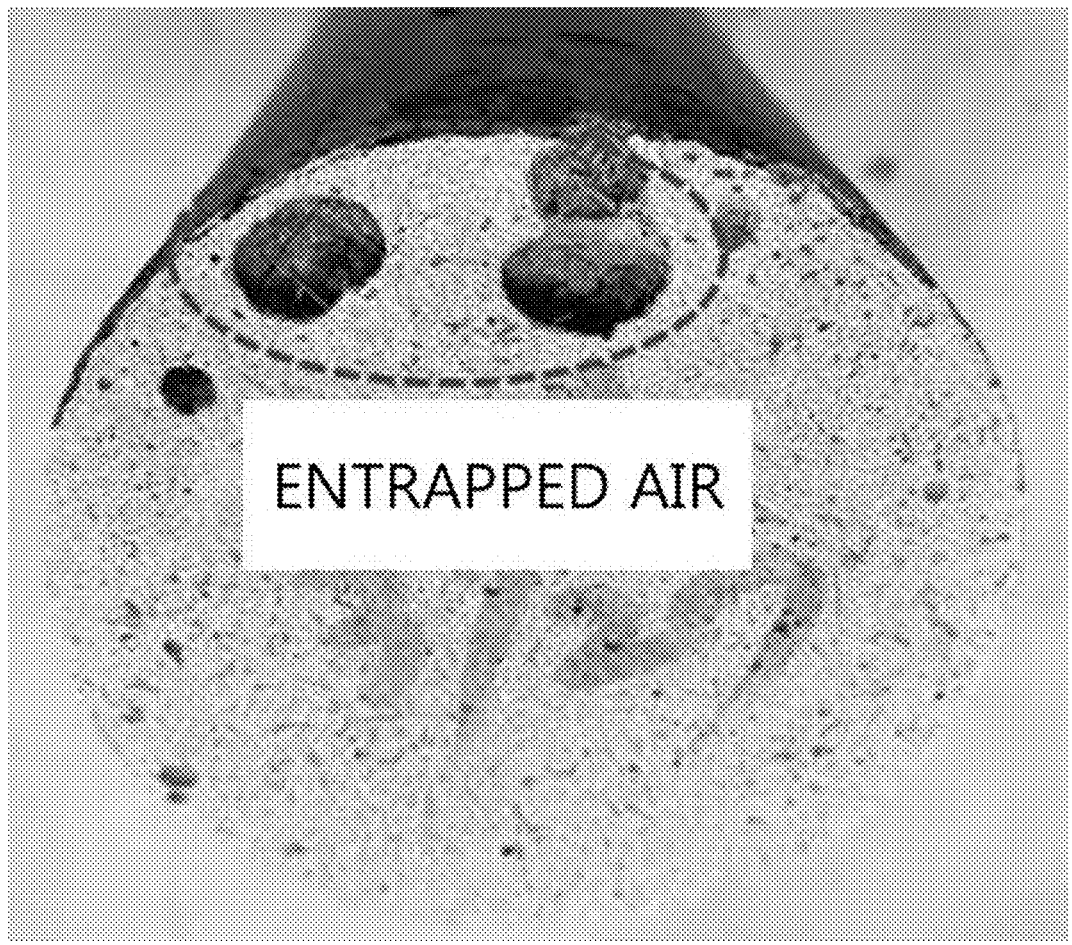
FIG. 5 is a picture showing a case in which entrapped air is generated while mixing ultra-high performance concrete (UHPC) according to the related art.

Hereinafter, embodiments of the present invention will be described in detail with reference to the accompanying drawings to allow those of ordinary skill in the art to which the present invention pertains to easily practice the present invention. However, the present invention may be implemented in various different forms and is not limited by the embodiments described herein. Also, in order to clearly describe the present invention, parts unrelated to the description have been omitted from the drawings, and similar parts will be denoted by like reference numerals throughout the specification.

Throughout the specification, when a certain part is described as "including" a certain element, this indicates that the certain part may further include another element instead of excluding another element unless the context clearly indicates otherwise.

First, in relation to a hyper-speed transportation system, it is necessary to maintain a partial-vacuum state, in which an atmospheric pressure is about 0.1 atm, to allow propulsion at a speed of 700 km/h or more. Here, a steel material, other alloys, ultra-high performance concrete (UHPC), or the like may be considered as a material of a partial-vacuum tube, but among the above, the UHPC has a dense structure and thus is not only able to implement a partial-vacuum tube of 0.1 atm at a thickness of less than or equal to 30 cm, but also able to allow vacuum pumps, which are for maintaining the partial-vacuum tube, to be arranged at intervals that are economically feasible. Therefore, a concrete vacuum tube segment for a hyper-speed transportation system according to an embodiment of the present invention is manufactured using the UHPC.

[Concrete Vacuum Tube Segment for Hyper-Speed Transportation System Using UHPC]

FIG. 6 is a view illustrating a composition ratio of the UHPC in a concrete vacuum tube segment for a hyper-speed transportation system using the UHPC according to an embodiment of the present invention.

In the concrete vacuum tube segment for the hyper-speed transportation system using the UHPC according to the embodiment of the present invention, as illustrated in FIG. 6, the UHPC may include 100 parts by weight of cement as a binder B, 20 to 30 parts by weight of silica fume as the binder B, 15 to 25 parts by weight of quartz powder as the binder B, 100 to 120 parts by weight of fine aggregate, 20 to 28 parts by weight of mixing water W, 4 to 7 parts by weight of a high-performance water reducing agent, and 1.6 to 2.2 parts by weight of an antifoaming agent, wherein the UHPC is mixed with a short fiber and a capsule-type crack healing material to form a self-healing cement composite, a volume of the mixed short fiber is 1.5 to 2% of the entire volume of the self-healing cement composite, and a volume of the mixed capsule-type crack healing material is 0.5 to 2% of the entire volume of the self-healing cement composite. Accordingly, the concrete vacuum tube segment may be formed as a vacuum tube segment for a hyper-speed transportation system.

Specifically, the silica fume may have a specific surface area in a range of 8,000 to 15,000 $cm^2/g$, but the present invention is not limited thereto.

The quartz powder may be a filler material containing 99% silicon dioxide ($SiO_2$) and may have an average particle diameter of 4 μm, but the present invention is not limited thereto.

The fine aggregate may be silica sand, which is quartz sand, and may have a particle diameter of less than or equal to 5 mm, but the present invention is not limited thereto.

A ratio W/B of the mixing water W to the binder B may be 0.2 to implement the UHPC.

The antifoaming agent may minimize entrapped air that is generated inside the UHPC due to high viscosity of the UHPC when mixing the UHPC.

The short fiber may be selected from the group consisting of a steel fiber, a glass fiber, a carbon fiber, an aramid fiber, and a basalt fiber and may have a length of less than or equal to 20 mm, but the present invention is not limited thereto.

The capsule-type crack healing material may include a microcapsule and a polymer matrix, and a microcapsule that has methacrylate as a core material and poly(urea-formaldehyde) as a capsule film-forming material may be added into the polymer matrix to form the capsule-type crack healing material.

Figure 7A:
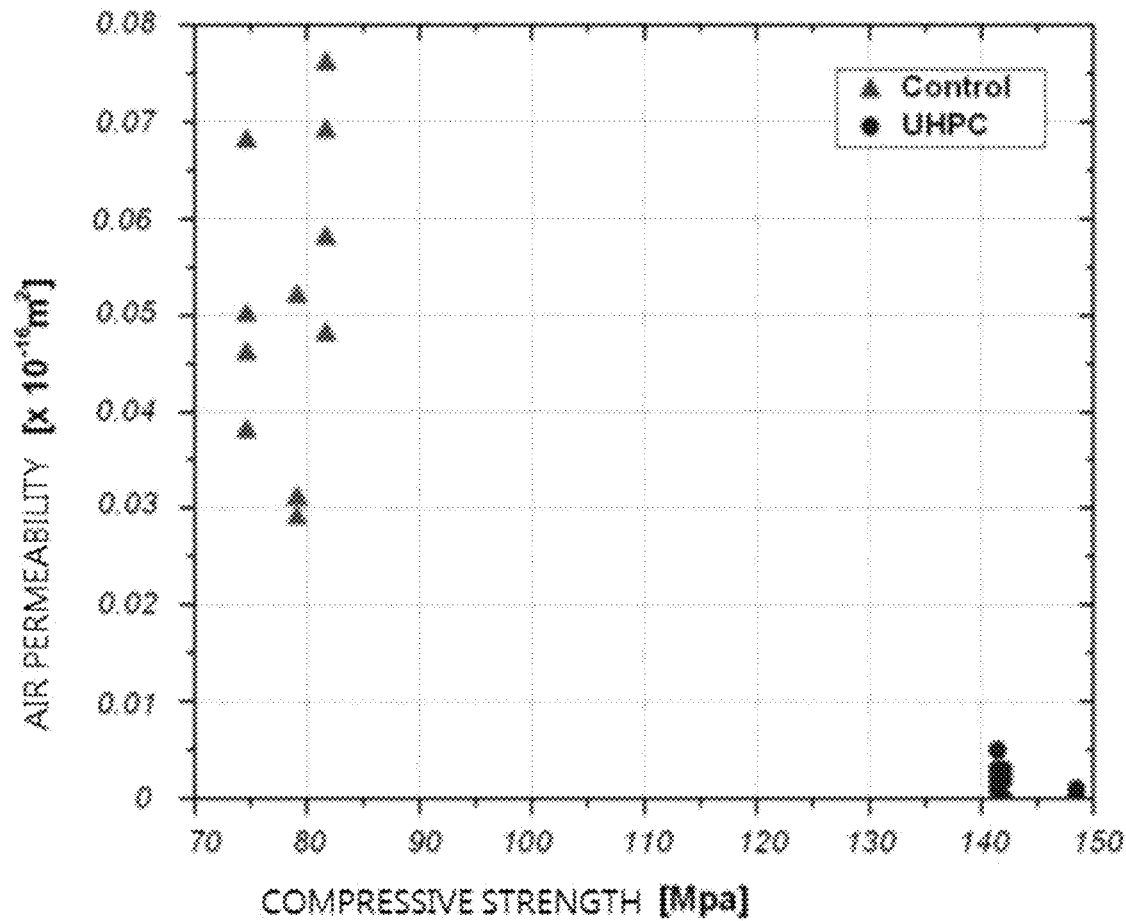
FIGS. 7A and 7B are views for comparing and describing airtightness of the UHPC in the concrete vacuum tube segment for the hyper-speed transportation system using the UHPC according to an embodiment of the present invention.
Figure 7B:
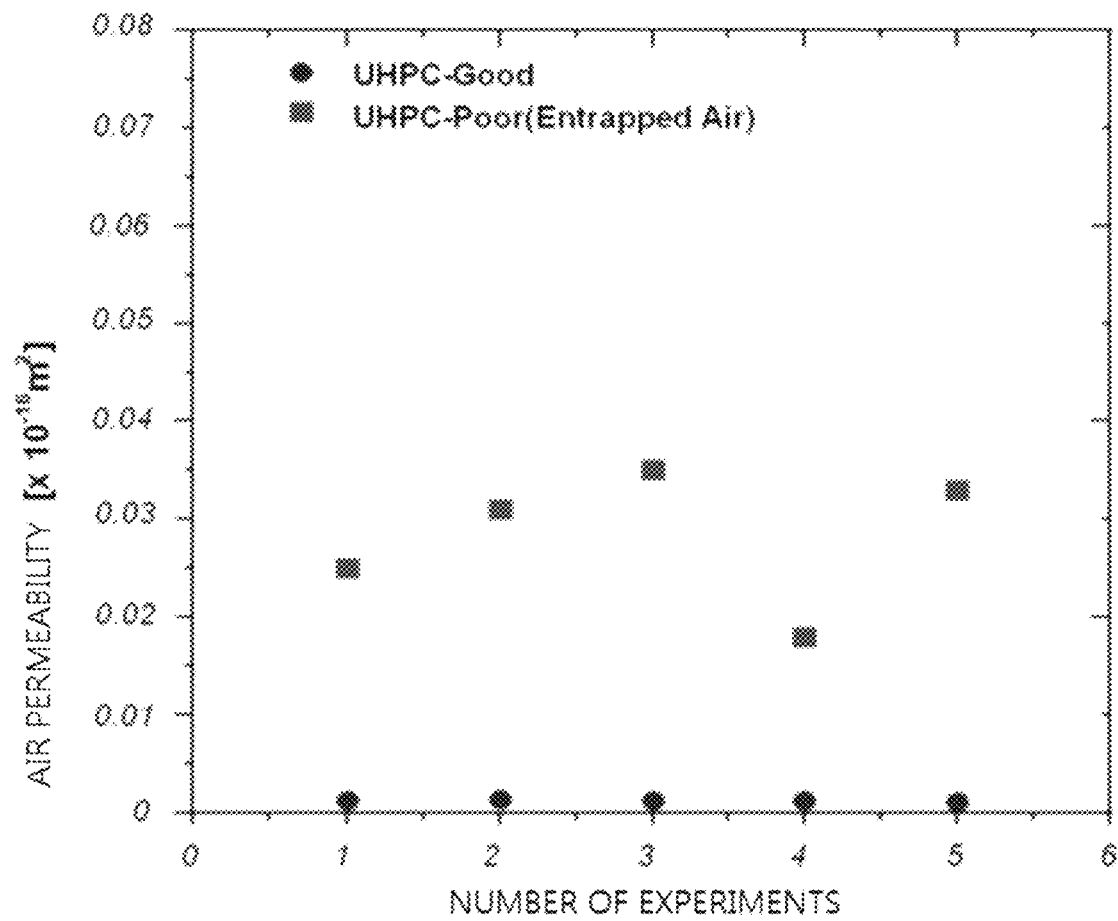

Meanwhile, FIGS. 7A and 7B are views for comparing and describing airtightness of the UHPC in the concrete vacuum tube segment for the hyper-speed transportation system using the UHPC according to an embodiment of the present invention.

FIG. 7A shows air permeability according to compressive strength, and FIG. 7B shows air permeability according to the number of experiments. As illustrated in FIGS. 7A and 7B, in the case of the concrete vacuum tube segment for the hyper-speed transportation system using the UHPC according to the embodiment of the present invention, since a self-healing cement composite is formed using the UHPC, and a mix proportion of the UHPC of the self-healing cement composite is designed on the basis of a maximum fill theory as well as dynamic performance and durability in which a compressive strength is in a range of 80 to 180 MPa, a flexural strength is 15 MPa or higher, a direct tensile strength is 7 MPa or higher, a service life is 100 to 200 years, and a shrinkage strain is 700 or lower, the structure inside the concrete is very dense, and watertightness and airtightness are excellent.

Figure 8:
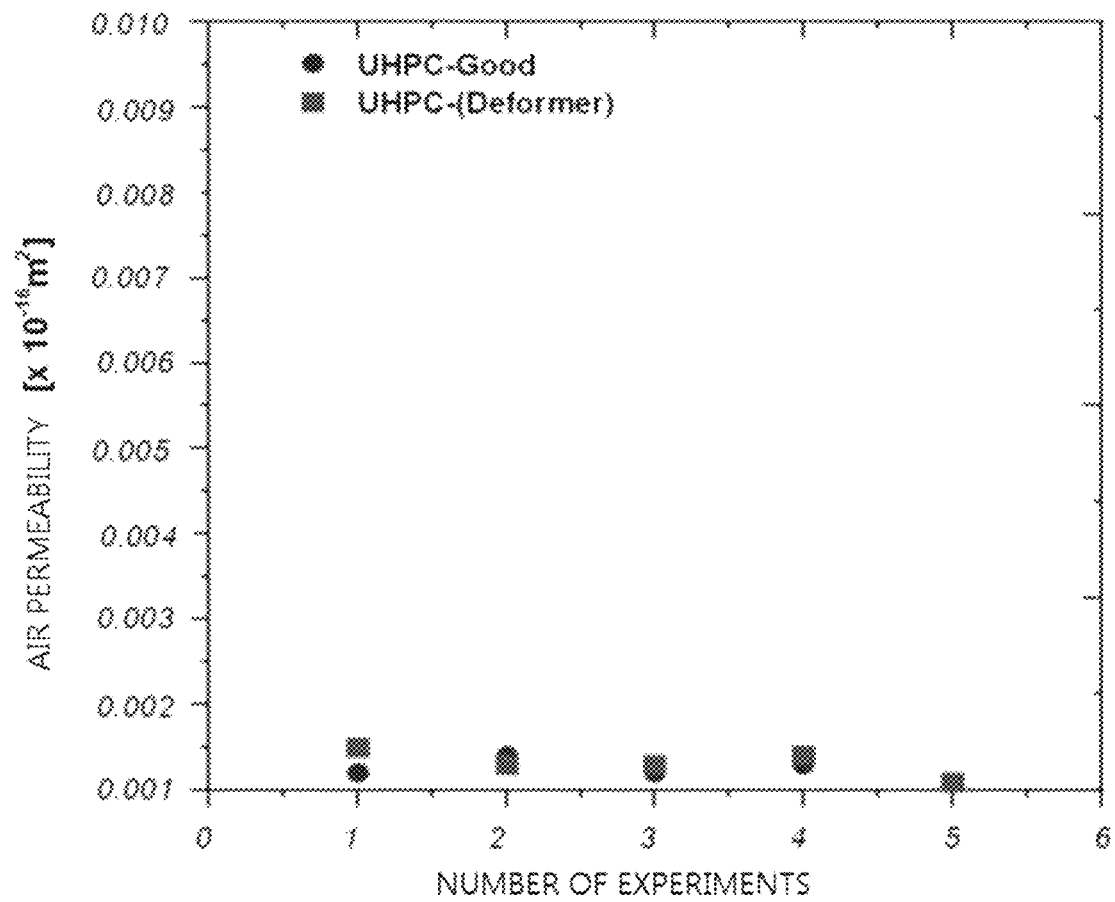
FIG. 8 is a view for describing improving the airtightness of the UHPC using an antifoaming agent in the concrete vacuum tube segment for the hyper-speed transportation system using the UHPC according to an embodiment of the present invention.

Meanwhile, FIG. 8 is a view for describing improving the airtightness of the UHPC using an antifoaming agent in the concrete vacuum tube segment for the hyper-speed transportation system using the UHPC according to an embodiment of the present invention, and FIG. 9 shows pictures that show before and after of removal of entrapped air when using the UHPC.

In the case of the concrete vacuum tube segment for the hyper-speed transportation system using the UHPC according to the embodiment of the present invention, as illustrated in FIG. 8, an antifoaming agent may be used to improve the airtightness of the UHPC. Since a large amount of entrapped air is generated in the process of mixing the UHPC due to high viscosity of the UHPC, pores remain in the UHPC after pouring of the UHPC is completed. Since the pores are one of the factors that decrease the airtightness, in the case of the embodiment of the present invention, a foam removing agent is used to minimize foam in the UHPC when mixing the UHPC. Here, a) of FIG. 9 shows a state before the removal of entrapped air when using the UHPC, and b) of FIG. 9 shows a state after the removal of entrapped air when using the UHPC. When mixing the UHPC, the antifoaming agent may be used to minimize foam in the UHPC.

Meanwhile, as a method of imparting self-healing ability to a material, there is a self-healing method using addition of a microcapsule containing a self-healing agent. Research on self-healing using microcapsules has mostly been carried out in the field of polymers and synthetic materials and has recently been applied to self-healing of cracks of concrete. The self-healing method using microcapsules is a method in which microcapsules, each containing a polymeric monomer therein as a core material, are manufactured and distributed inside concrete. The method is a concept in which, when cracks are formed in the concrete, the microcapsules are broken so that the monomers therein flow between crack faces, and the monomers which penetrate into the cracks cause a polymerization reaction due to a catalyst so that the cracks self-heal.

However, since such methods use a catalyst in a polymer matrix, there is a problem in terms of economic feasibility, and the process becomes complicated due to requiring a uniform distribution process for the catalyst. Also, there is a disadvantage in that physical properties of formed materials are not constant according to the amount of mixed catalyst and the degree of distribution of the catalyst, and there are many limitations such as the possibility of deterioration of the catalyst during long-term storage. Therefore, the self-healing agent, which may react due to light without using a catalyst, may be formed into microcapsules to allow self-healing of cracks in concrete surfaces.

That is, microcapsules each having methacrylate as a core material and poly(urea-formaldehyde) as a capsule film-forming material may be added into a polymer matrix and coated on a concrete surface, and in this way, when fine cracks are formed and propagate in the concrete surface, the microcapsules placed at positions where the cracks propagate are broken so that the monomers therein flow between crack faces, and the monomers which penetrate into the cracks cause a polymerization reaction due to light so that the cracks self-heal. The self-healing performance may be evaluated using experiments on water absorbability and water permeability and observation through an optical microscope. As a result, the proposed self-healing system may be used to partially repair cracks in concrete.

Figure 10:
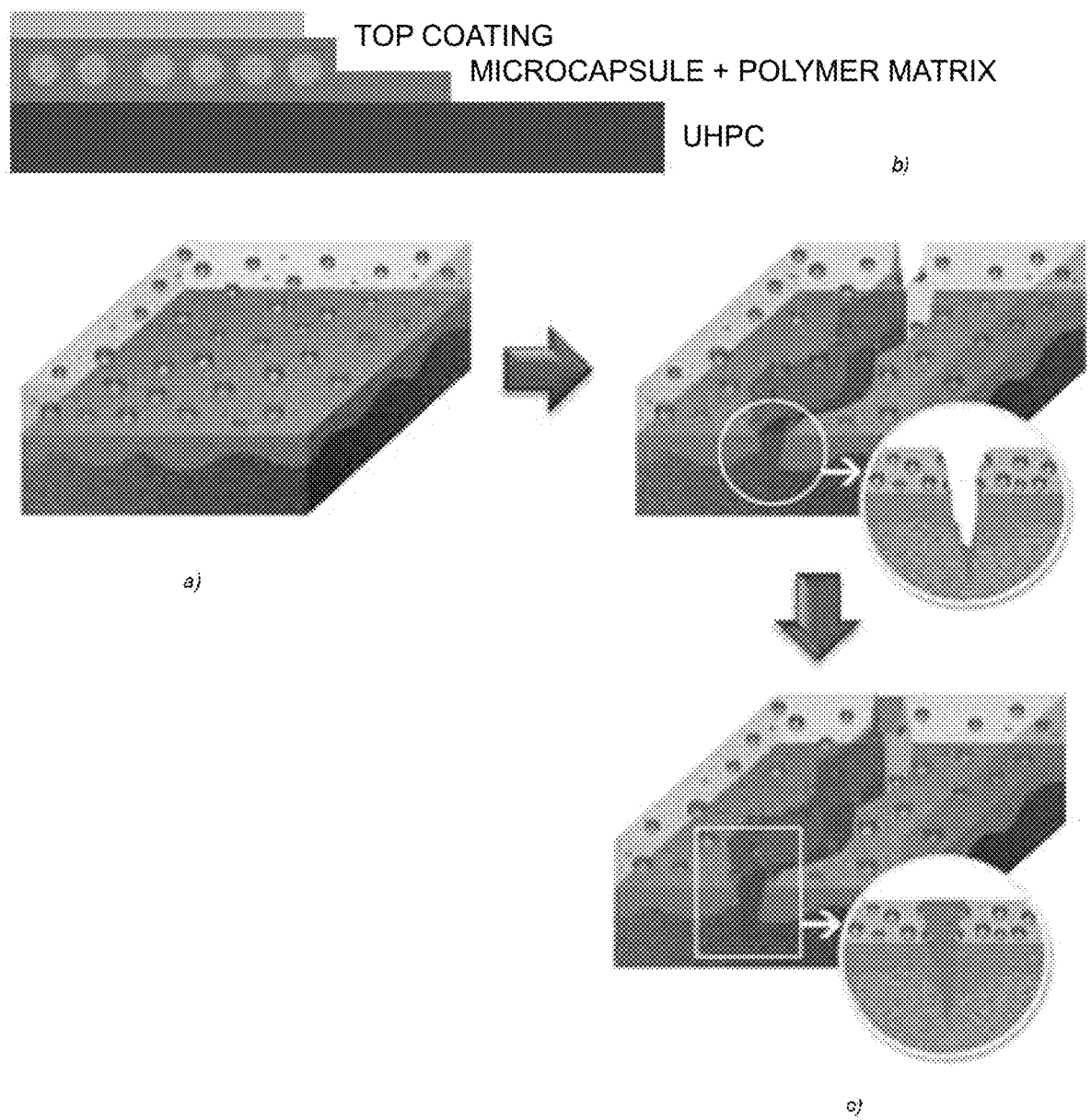
FIG. 10 is a view for describing a capsule-type crack healing material in the concrete vacuum tube segment for the hyper-speed transportation system using the UHPC according to an embodiment of the present invention in detail.

FIG. 10 is a view for describing a capsule-type crack healing material in the concrete vacuum tube segment for the hyper-speed transportation system using the UHPC according to an embodiment of the present invention in detail.

The structure of the self-healing system and the concept of self-healing using microcapsules when cracks are formed in the concrete vacuum tube segment for the hyper-speed transportation system using the UHPC according to the embodiment of the present invention are illustrated in FIG. 10. Specifically, the structure is a structure in which a polymer matrix is used as a primer and an intermediate coating material on a concrete surface and microcapsules containing a self-healing agent are mixed with the polymer matrix. Also, a top coating material is applied on the top layer to form a double coating structure. Then, when cracks are formed in the concrete, the polymer matrix mixed with the microcapsules is broken and the self-healing agent in the microcapsules flows out and causes a polymerization reaction due to light to form a siloxane structure and fill the cracks.

Consequently, the concrete vacuum tube segment for the hyper-speed transportation system using the UHPC according to the embodiment of the present invention may be easily manufactured using the UHPC, in which shrinkage and structural cracking do not occur due to using a binder such as cement, filler material, silica fume, and silica sand, which is for securing airtightness on the basis of the maximum fill theory, and using a short fiber such as a steel fiber, a glass fiber, a carbon fiber, an aramid fiber, and a basalt fiber, which is for securing a tensile force, and accordingly, shrinkage of the concrete vacuum tube segment may be reduced even in a partial-vacuum state in which the magnitude of drying shrinkage is very small and quick drying occurs. Also, the capsule-type crack healing material, which is able to repair fine cracks, may be compacted to secure the airtightness of the concrete vacuum tube segment.

[Method of Manufacturing Concrete Vacuum Tube Segment for Hyper-Speed Transportation System Using UHPC]

Figure 11:
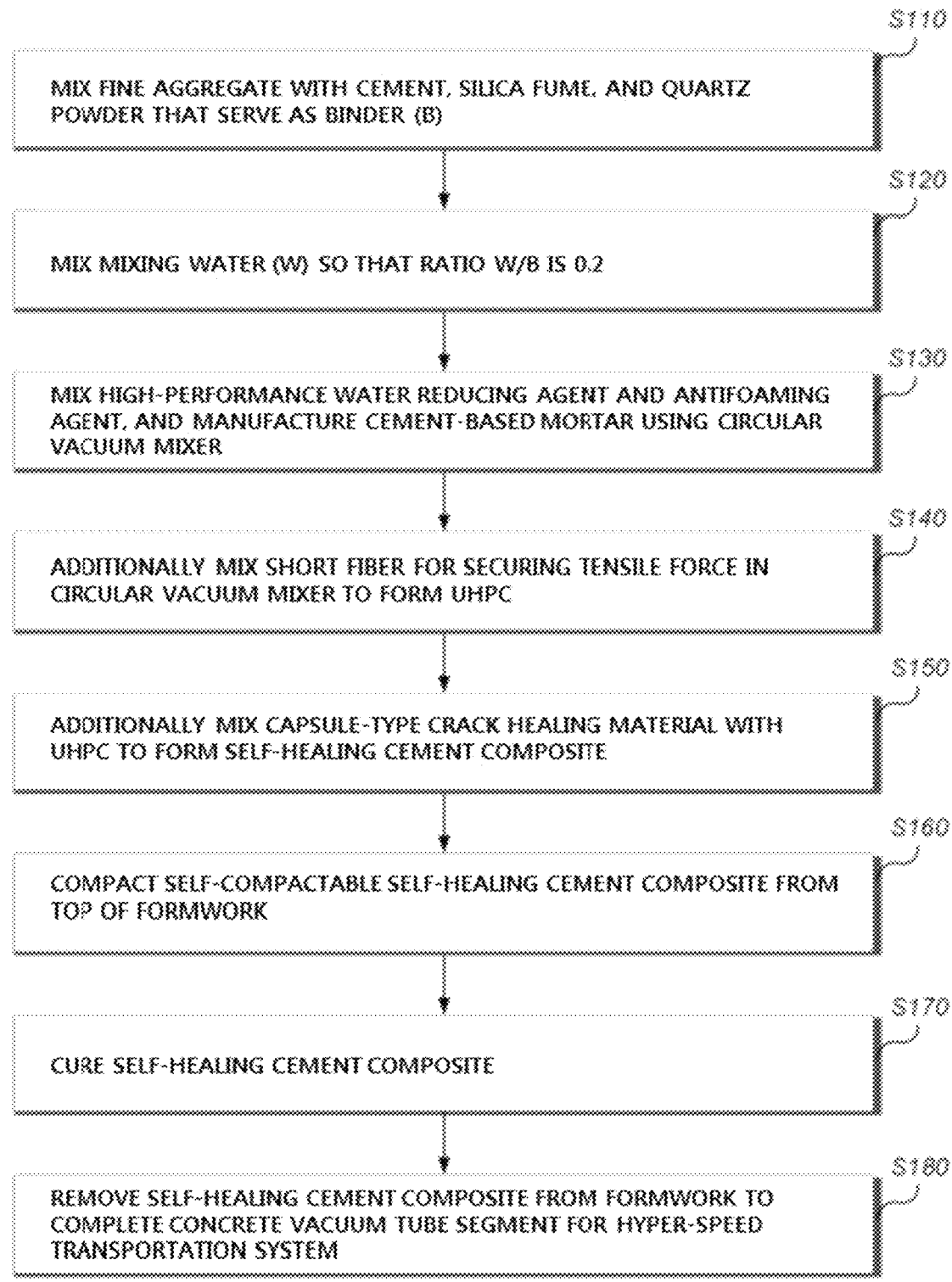
FIG. 11 is an operational flowchart showing a method of manufacturing a concrete vacuum tube segment for a hyper-speed transportation system using UHPC according to an embodiment of the present invention.
Figure 12:
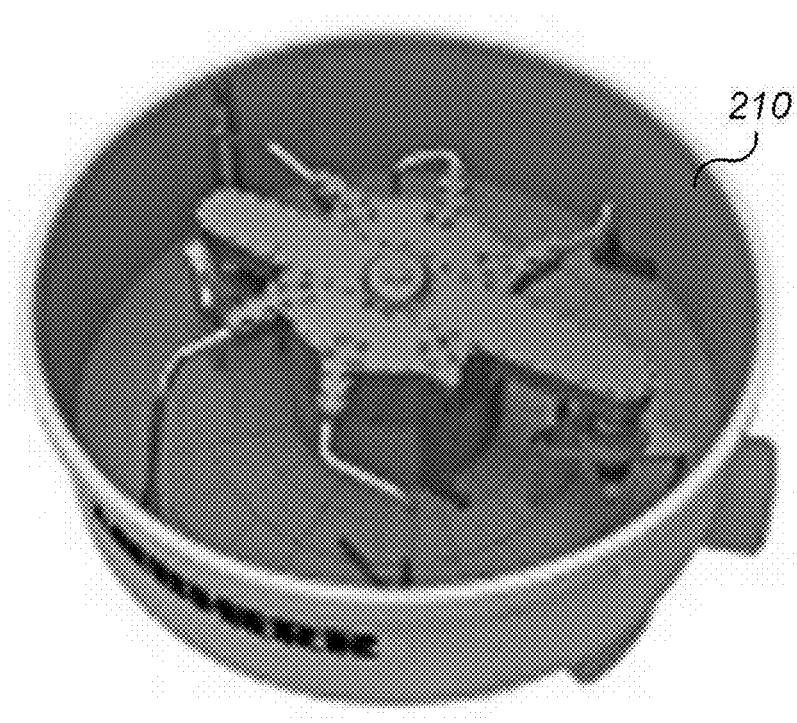
FIG. 12 is a picture showing a circular vacuum mixer for manufacturing the concrete vacuum tube segment for the hyper-speed transportation system using the UHPC according to an embodiment of the present invention.

FIG. 11 is an operational flowchart showing a method of manufacturing a concrete vacuum tube segment for a hyper-speed transportation system using UHPC according to an embodiment of the present invention, and FIG. 12 is a picture showing a circular vacuum mixer for manufacturing the concrete vacuum tube segment for the hyper-speed transportation system using the UHPC according to an embodiment of the present invention.

Referring to FIG. 11, in the method of manufacturing the concrete vacuum tube segment for the hyper-speed transportation system using UHPC according to the embodiment of the present invention, first, fine aggregate is mixed with cement, silica fume, and quartz powder that serve as a binder B (S110). Specifically, 100 parts by weight of cement, 20 to 30 parts by weight of silica fume, and 15 to 25 parts by weight of quartz powder are thoroughly mixed with 100 to 120 parts by weight of fine aggregate for 20 to 30 seconds at a speed in a range of 10 to 20 rpm, preferably, at a speed of 15 rpm. Here, preferably, the silica fume has a specific surface area in a range of 8,000 to 15,000 $cm^2/g$, the quartz powder is a filler material containing 99% silicon dioxide ($SiO_2$) and has an average particle diameter of 4 μm, and the fine aggregate is silica sand, which is quartz sand, and has a particle diameter of less than or equal to 5 mm.

Next, mixing water W is mixed so that a mixing water-binder ratio W/B is 0.2 (S120).

Next, a high-performance water reducing agent and an antifoaming agent are mixed, and a circular vacuum mixer is used to manufacture cement-based mortar (S130). Specifically, with respect to 100 parts by weight of the cement, 4 to 7 parts by weight of the high-performance water reducing agent and 1.6 to 2.2 parts by weight of the antifoaming agent are mixed for 2 to 3 minutes at a speed in a range of 20 to 50 rpm in a circular vacuum mixer 210. Here, when mixing UHPC, as illustrated in FIG. 12, the circular vacuum pump 210 may be used to remove generated entrapped air to minimize the entrapped air.

Next, a short fiber for securing a tensile force is additionally mixed in the circular vacuum mixer 210 to form the UHPC (S140). Specifically, preferably, the short fiber is selected from the group consisting of a steel fiber, a glass fiber, a carbon fiber, an aramid fiber, and a basalt fiber and has a length of less than or equal to 20 mm.

Next, a capsule-type crack healing material is additionally mixed with the UHPC to form a self-healing cement composite (S150). Here, the capsule-type crack healing material may include a microcapsule and a polymer matrix, and a microcapsule that has methacrylate as a core material and poly(urea-formaldehyde) as a capsule film-forming material may be added into the polymer matrix to form the capsule-type crack healing material.

In other words, the UHPC includes 100 parts by weight of cement as the binder B, 20 to 30 parts by weight of silica fume as the binder B, 15 to 25 parts by weight of quartz powder as the binder B, 100 to 120 parts by weight of fine aggregate, 20 to 28 parts by weight of mixing water W, 4 to 7 parts by weight of high-performance water reducing agent, and 1.6 to 2.2 parts by weight of antifoaming agent, the UHPC is mixed with the short fiber and the capsule-type crack healing material to form the self-healing cement composite, a volume of the mixed short fiber is 1.5 to 2% of the entire volume of the self-healing cement composite, and a volume of the mixed capsule-type crack healing material is 0.5 to 2% of the entire volume of the self-healing cement composite. Accordingly, the self-healing cement composite has a compressive strength in a range of 80 to 180 MPa, a flexural strength of 15 MPa or higher, a direct tensile strength of 7 MPa or higher, a service life of 100 to 200 years, and a shrinkage strain of 700 or lower.

Next, when mixing is completed, the self-compactable self-healing cement composite is compacted from the top of a formwork (S160). Specifically, self-compactable UHPC, which is able to be compacted entirely from the top of the formwork, may be used, and accordingly, a concrete vacuum tube segment having better airtightness may be manufactured.

Next, the self-healing cement composite 100a is cured (S170), and then, the self-healing cement composite 100a is removed from the formwork to complete the concrete vacuum tube segment for the hyper-speed transportation system (S180).

Consequently, according to an embodiment of the present invention, in the case of the UHPC, shrinkage may be reduced even in a partial-vacuum state in which the magnitude of drying shrinkage is very small and quick drying occurs. Also, when manufacturing a circular vacuum tube segment for a hyper-speed transportation system, self-compactable UHPC, which is able to be compacted entirely from the top of the formwork, may be used, and accordingly, a concrete vacuum tube segment having better airtightness may be manufactured.

According to the present invention, a concrete vacuum tube segment for a hyper-speed transportation system can be easily manufactured using UHPC, in which shrinkage and structural cracking do not occur due to mixing a binder and a short fiber to secure airtightness on the basis of a maximum fill theory, and accordingly, shrinkage of the concrete vacuum tube segment can be reduced even in a partial-vacuum state in which the magnitude of drying shrinkage is very small and quick drying occurs.

According to the present invention, when mixing the UHPC, an antifoaming agent can be mixed, and generated entrapped air can be removed using a circular vacuum pump to minimize the entrapped air.

According to the present invention, a capsule-type crack healing material, which is able to repair fine cracks, can be compacted to secure airtightness of the concrete vacuum tube segment.

According to the present invention, when manufacturing a circular vacuum tube segment for the hyper-speed transportation system, self-compactable UHPC, which is able to be compacted entirely from the top of a formwork, can be used to manufacture a concrete vacuum tube segment having better airtightness.

The above-given description of the present invention is only illustrative, and those of ordinary skill in the art to which the present invention pertains should understand that the present invention may be modified to other specific forms without changing the technical idea or essential features of the present invention. Therefore, the embodiments described above should be understood as illustrative, rather than limiting, in all aspects. For example, each element described as having a single form may be separated into a plurality of parts and practiced, and likewise, elements described as being separated may be combined and practiced.

The scope of the present invention is shown in the claims below rather than in the detailed description above, and all changes or modifications derived from the meaning and scope of the claims and their equivalents should be interpreted as falling within the scope of the present invention.

What is claimed is:

1. A concrete vacuum tube segment for a hyper-speed transportation system using ultra-high performance concrete (UHPC), wherein the UHPC comprises:
   100 parts by weight of cement as a binder (B);
   20 to 30 parts by weight of silica fume as the binder (B);
   15 to 25 parts by weight of quartz powder as the binder (B);
   100 to 120 parts by weight of fine aggregate;
   20 to 28 parts by weight of mixing water (W);
   4 to 7 parts by weight of a high-performance water reducing agent; and
   1.6 to 2.2 parts by weight of an antifoaming agent,
   wherein the UHPC is mixed with a short fiber and a capsule-type crack healing material to form a self-healing cement composite, a volume of the mixed short fiber is 1.5 to 2% of the entire volume of the self-healing cement composite, and a volume of the mixed capsule-type crack healing material is 0.5 to 2% of the entire volume of the self-healing cement composite.

2. The concrete vacuum tube segment of claim 1, wherein the self-healing cement composite has a compressive strength in a range of 80 to 180 MPa, a flexural strength of 15 MPa or higher, a direct tensile strength of 7 MPa or higher, a service life of 100 to 200 years, and a shrinkage strain of 700 or lower.

3. The concrete vacuum tube segment of claim 1, wherein the capsule-type crack healing material includes a microcapsule and a polymer matrix, and a microcapsule that has methacrylate as a core material and poly(urea-formaldehyde) as a capsule film-forming material is added into the polymer matrix.

4. The concrete vacuum tube segment of claim 3, wherein, when fine cracks are formed and propagate in a concrete surface, in the capsule-type crack healing material, the microcapsule placed at a position where the cracks propagate is broken so that a monomer therein flows between crack faces, and the monomer which penetrates into the cracks causes a polymerization reaction due to light so that the cracks self-heal.

5. The concrete vacuum tube segment of claim 1, wherein the silica fume has a specific surface area in a range of 8,000 to 15,000 cm2/g.

6. The concrete vacuum tube segment of claim 1, wherein the quartz powder is a filler material containing 99% silicon dioxide (SiO2) and has an average particle diameter of 4 μm.

7. The concrete vacuum tube segment of claim 1, wherein the fine aggregate is silica sand, which is quartz sand, and has a particle diameter of less than or equal to 5 mm.

8. The concrete vacuum tube segment of claim 1, wherein a ratio (W/B) of the mixing water (W) to the binder (B) is 0.2.

9. The concrete vacuum tube segment of claim 1, wherein the short fiber is selected from the group consisting of a steel fiber, a glass fiber, a carbon fiber, an aramid fiber, and a basalt fiber and has a length of less than or equal to 20 mm.

10. The concrete vacuum tube segment of claim 1, wherein the antifoaming agent minimizes entrapped air that is generated inside the UHPC due to high viscosity of the UHPC when mixing the UHPC.

11. A method of manufacturing a concrete vacuum tube segment for a hyper-speed transportation system using ultra-high performance concrete (UHPC), the method comprising:
 a) mixing a fine aggregate with cement, silica fume, and quartz powder that serve as a binder (B);
 b) mixing mixing water (W) so that a ratio (W/B) of the mixing water (W) to the binder (B) is 0.2;
 c) mixing a high-performance water reducing agent and an antifoaming agent and manufacturing cement-based mortar using a circular vacuum mixer;
 d) additionally mixing a short fiber, which is for securing a tensile force, in the circular vacuum mixer to form the UHPC;
 e) additionally mixing a capsule-type crack healing material with the UHPC to form a self-healing cement composite;
 f) compacting the self-healing cement composite in a formwork;
 g) curing the self-healing cement composite; and
 h) removing the self-healing cement composite from the formwork to complete the concrete vacuum tube segment for a hyper-speed transportation system.

12. The method of claim 11, wherein the UHPC includes 100 parts by weight of cement as a binder (B), 20 to 30 parts by weight of silica fume as the binder (B), 15 to 25 parts by weight of quartz powder as the binder (B), 100 to 120 parts by weight of fine aggregate, 20 to 28 parts by weight of mixing water (W), 4 to 7 parts by weight of a high-performance water reducing agent, and 1.6 to 2.2 parts by weight of an antifoaming agent, wherein the UHPC is mixed with a short fiber and a capsule-type crack healing material to form a self-healing cement composite, a volume of the mixed short fiber is 1.5 to 2% of the entire volume of the self-healing cement composite, and a volume of the mixed capsule-type crack healing material is 0.5 to 2% of the entire volume of the self-healing cement composite.

13. The method of claim 12, wherein the self-healing cement composite has a compressive strength in a range of 80 to 180 MPa, a flexural strength of 15 MPa or higher, a direct tensile strength of 7 MPa or higher, a service life of 100 to 200 years, and a shrinkage strain of 700 or lower.

14. The method of claim 11, wherein, in operation c), when mixing the UHPC, the circular vacuum mixer is used to remove generated entrapped air to minimize the entrapped air.

15. The method of claim 11, wherein the self-healing cement composite in operation f) is formed using self-compactable UHPC and is entirely compacted from the top of the formwork to allow the concrete vacuum tube segment to have high airtightness.

16. The method of claim 12, wherein the capsule-type crack healing material includes a microcapsule and a polymer matrix, and a microcapsule that has methacrylate as a core material and poly(urea-formaldehyde) as a capsule film-forming material is added into the polymer matrix.

17. The method of claim 16, wherein, when fine cracks are formed and propagate in a concrete surface, in the capsule-type crack healing material, the microcapsule placed at a position where the cracks propagate is broken so that a monomer therein flows between crack faces, and the monomer which penetrates into the cracks causes a polymerization reaction due to light so that the cracks self-heal.

18. The method of claim 12, wherein the short fiber is selected from the group consisting of a steel fiber, a glass fiber, a carbon fiber, an aramid fiber, and a basalt fiber and has a length of less than or equal to 20 mm.

19. The method of claim 12, wherein the antifoaming agent minimizes entrapped air that is generated inside the UHPC due to high viscosity of the UHPC when mixing the UHPC.

* * * * *